(No Model.) 2 Sheets—Sheet 2.

F. SIBLEY.
APPARATUS FOR DESULPHURIZING ORES.

No. 355,222. Patented Dec. 28, 1886.

WITNESSES
John Becker

INVENTOR
F. Sibley
by Thos. M. Higgins
Attorney

UNITED STATES PATENT OFFICE.

FREDERICK SIBLEY, OF NEW YORK, N. Y.

APPARATUS FOR DESULPHURIZING ORES.

SPECIFICATION forming part of Letters Patent No. 355,222, dated December 28, 1886.

Application filed April 28, 1886. Serial No. 200,409. (No model.)

*To all whom it may concern:*

Be it known that I, FREDERICK SIBLEY, a citizen of the United States, residing in New York city, county and State of New York, have invented an improvement in apparatus for desulphurizing ores, also applicable to the treatment of iron pyrites for the manufacture of sulphuric acid therefrom, and which may also be used for the treatment of various mixtures of ores and reducing materials.

The object of my invention is to secure a more thorough and economical desulphurization of ores containing sulphur, or of iron pyrites, in a continuous process and in such manner that the vapors of the escaping sulphur may be retained and utilized in the manufacture of sulphuric acid as a by-product, if desired.

The invention consists in an apparatus which, in general terms, may be said to consist of a fire-box, to which air is led both under and over the grate, the air being led in under the grate in sufficient quantity to supply the needs of combustion of fuel contained in the fire-box, and a surplus of air more than is needed for combustion being led in over the grate, to be heated by fuel thereon, said fire-box being surmounted by a porous or interstitial cylindrical chamber, which, in conjunction with another porous or interstitial cylindrical chamber placed concentrically with the first-named chamber, is arranged in such manner as to leave an annular space between said porous or interstitial cylinders for the reception and passage of ores or other materials to be treated, the air being passed into the furnace below and above the grate under such pressure as to force it, together with the gases of combustion, through the interstices or pores of said interstitial or porous chambers and through the materials to be treated in the annular space between said chambers, during which passage the action of the air upon the sulphur contained in the materials performs the operation of desulphurization.

The invention further consists in certain details of construction, which will appear from the following description with reference to the drawings, of which—

Figure 1:
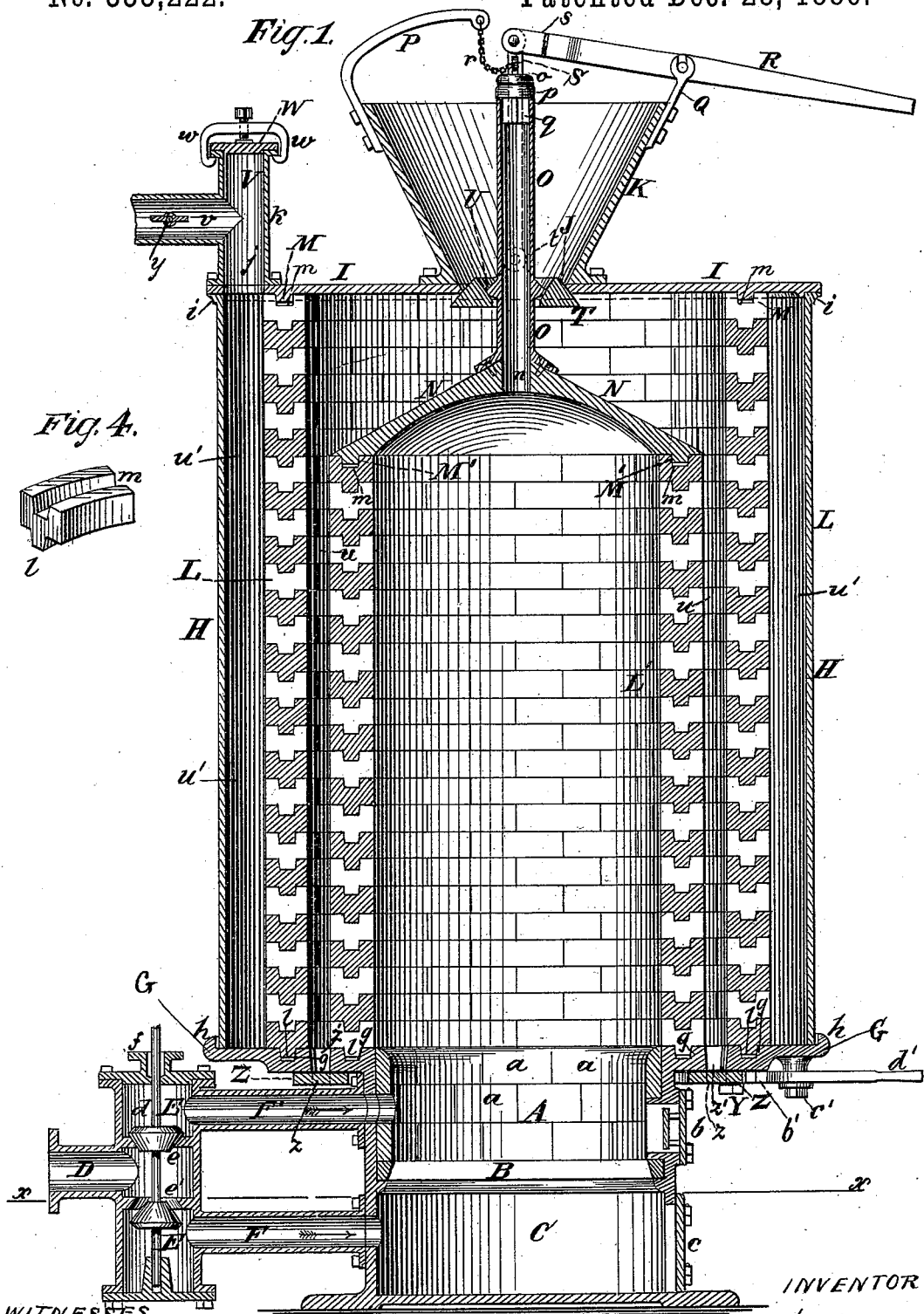
Figure 2:
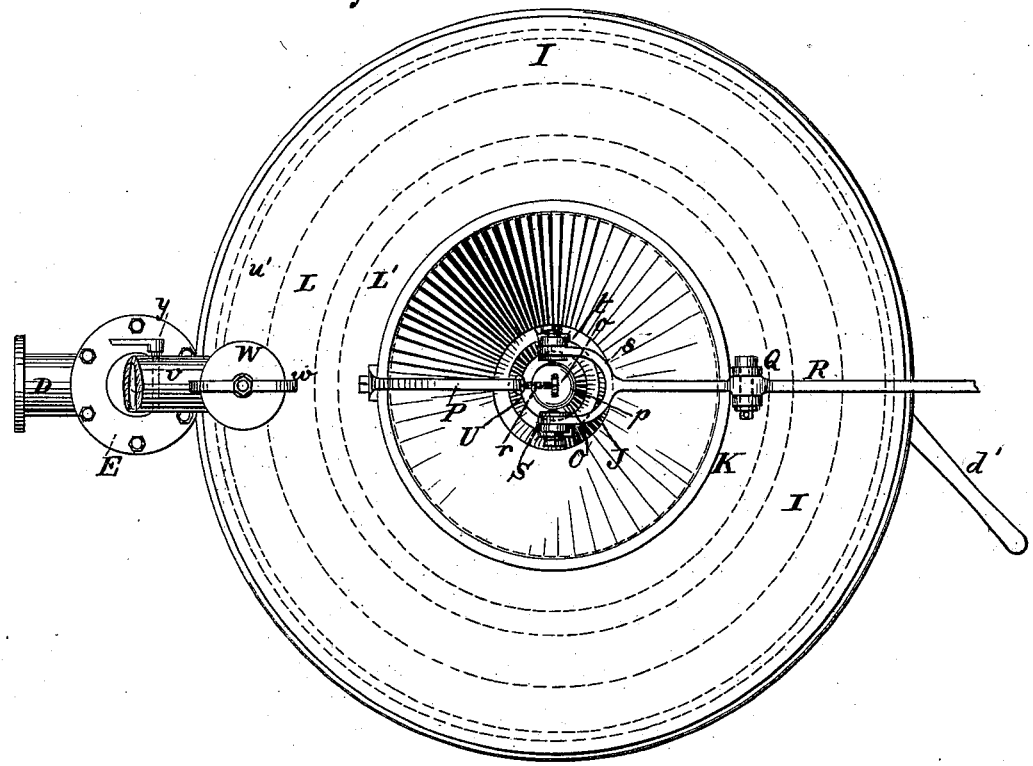
Figure 3:
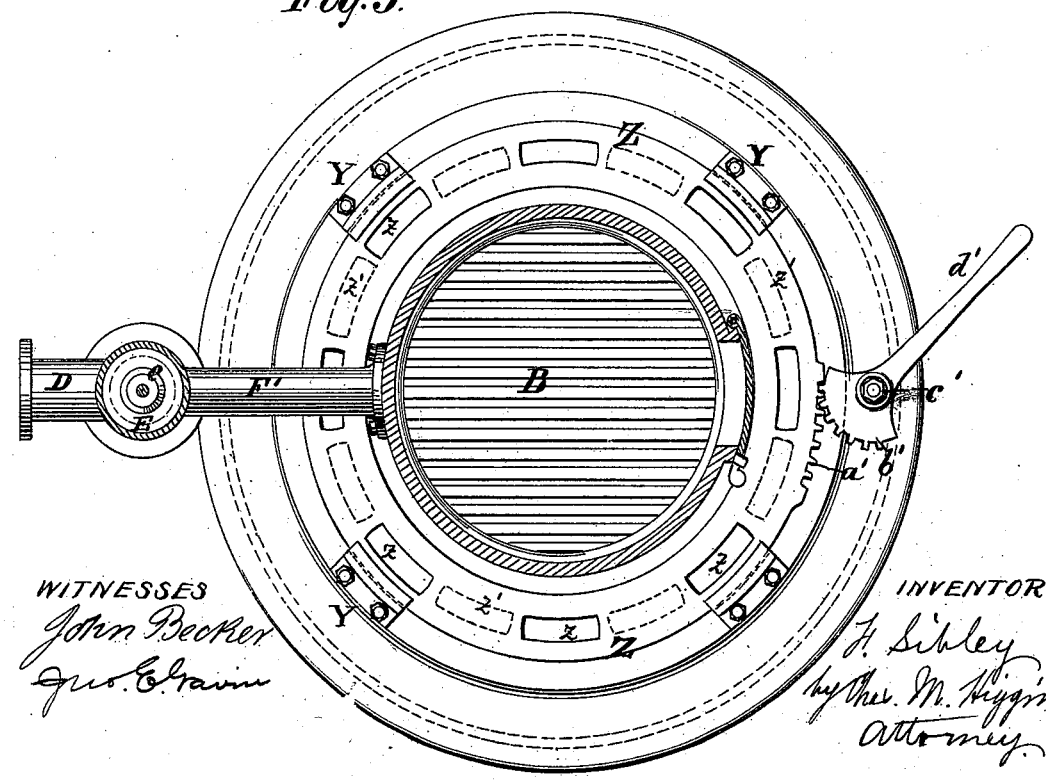

Figure 1 is a vertical section through the apparatus employed for carrying out the process. Fig. 2 is a top or plan view of the same, and Fig. 3 is a horizontal cross-section on line $x\ x$ in Fig. 1, as it would appear in looking from the bottom upward. Fig. 4 is a perspective view of a fire-box having a form preferable for the purpose of supporting the porous or interstitial chambers.

A is the fire-box, preferably lined with fire brick $a$.

B is the grate; $b$, the fire-door for introducing fuel to the fire-box.

C is the ash-pit, and $c$ the door thereof. Both the doors $b$ and $c$ are made to close tightly against air-pressure, in order to afford sufficient resistance for acquiring the desired pressure in the interior of the apparatus, as will be hereinafter more fully described.

D is an induction-pipe for air to be delivered from a blower or compressing-engine into the apparatus, for the purpose specified, and hereinafter more fully explained.

The pipe D is connected with a valve-chest, E, in which are valves $e$, arranged on a valve-stem, $d$, for the purpose of regulating the position of the said valves. The valve-stem $d$ passes through a stuffing-box, $f$, and may be connected on the outside with any suitable regulating apparatus for adjusting the valves and holding them in any position required.

F F' are pipes leading from the valve box or chest E to the furnace or fire-box A. The pipe F leads to the fire-box below the grate, and the pipe F' leads to the fire-box above the grate and above the fuel thereon. The valves $e$ in the valve-chest E are shown, in the example of my invention herewith illustrated, as being puppet-valves arranged with reference to their seats in such manner that when the lower of said valves is opened or partly opened the upper one is closed or partly closed by the vertical adjustment of the stem $d$. The air which enters through the induction-pipe D may be proportionally divided in its passage through the pipes F and F' in such manner that the portion which is led into the fire-box over the grate may have any relation of quantity with that which enters below the grate. That which enters below the grate passes in through the fuel and controls its combustion. That which is led in over the grate completes the combustion of the gases generated from the fuel, and at the same time supplies a surplus of air more than is necessary for such combustion, as hereinbefore stated.

Surmounting the fire-box A, and attached to the same or cast integral therewith, is a broad rim, G, of sufficient strength to support the superstructure resting thereon, and extending entirely around the fire-box, which is preferably cylindrical in form, as shown in Figs. 2 and 3. At a suitable radial distance from each other are formed in the upper surface of the rim G annular recesses $g$, which extend entirely around in the upper surface of said rim G, and at the outer border or margin of said rim is an upwardly-projecting flange, $h$, attached to the rim G, or formed integrally therewith. Resting upon the outer margin of the rim G, within the upwardly-projecting flange $h$, is a shell, H, made of boiler-iron or other suitable material. At the upper termination of the shell H is formed or attached a flange, $i$, to which is bolted or otherwise attached a circular plate, I. Said circular plate has in the middle a circular opening, J, and near its margin a smaller circular opening, $j$. In relation with the central circular opening, J, is attached to the plate I a hopper, K, and in relation with the opening $j$ is attached a pipe, $k$. Within the shell H is a hollow cylinder, L. Said cylinder is preferably made of segmental fire-bricks, these bricks being formed as shown in Fig. 4, their inner and outer surfaces conforming to the interior and outer circumferences of the cylinder L, and each having on the bottom a tapered tongue or projection, $l$, and a groove, $m$, in the upper surface, the form of the groove or recess $m$ being similar to that of the tapered projection $l$, so that when the bricks are laid up into a wall or cylinder, as shown in Fig. 1, the downward projections $l$ of one tier fit easily into the grooves or recesses $m$ of the next tier of bricks below. This construction of the bricks enables the cylinders to be laid up without mortar, and the inaccuracy of the fit of the tongues of the bricks into the recesses of the same leaves passages for air or other gases through the joints, which passages, together with the porous character of the bricks, cause the air or gases which pass through the walls of the cylinders, as hereinafter described, to be thoroughly diffused. In laying up this cylinder the tapered projections $l$ of the first course of the bricks fit into the recess $g$ in the rim G in such manner as to engage firmly, and thus hold the entire cylinder L when constructed concentrically with the fire-box A.

The upper plate or cap, I, of the apparatus has also cast upon it a downwardly-projecting ring, M, which engages the recesses $m$ in the upper sides of the upper course of bricks, and thus holds the upper part of the cylinder L concentrically with the fire-box and other parts of the apparatus, hereinafter described.

At a suitable distance from the cylinder L is built up in the same manner an interior cylinder, L′, preferably made of fire-bricks of the same form, except that their interior and exterior curvature conforms to a shorter radius than those of the exterior cylinder. The projections $l$ of the bottom tier of bricks fit into the inner annular recess, $g$, in the rim G in the same manner as that described for the exterior cylinder, L, and for the same purpose. The interior cylinder, L′, is not so high as the exterior cylinder, L. It rises to about three-fourths the distance from the rim G to the cap-plate I, and is surmounted by a cap, N. This cap is preferably of cast-iron, and is made on its upper surface of conical form, as shown in Fig. 1, and on its under surface it has preferably the form of a segment of a hollow sphere.

The conical form of the upper surface of the cap N enables it to distribute the material which falls upon it through the opening J of the cap I, for charging the annular space between the cylinders L and L′ equally to all parts of said annular space. Centrally through the apex of this cap is an opening, $n$, and it has formed upon it a concentric downwardly-projecting ring, M′, for engaging the upper recess, $m$, in the upper tier of the fire-bricks of which the said cylinder L′ is built.

In relation with the central opening, $n$, in the cap N is attached, by riveting or otherwise to said cap, a vertical ascending pipe, O, which passes centrally upward through the opening J and the hopper K to a point a little above the top of said hopper, and is there surmounted by a valve, $o$. Said valve has a stem, $p$, and wing-guides $q$, said stem projecting above the valve and being attached by a chain, $r$, to a bracket, P, riveted or otherwise attached to the upper margin of the hopper K.

To the upper margin of the hopper K is riveted or bolted a bracket, Q, and to this bracket is pivoted a lever, R. The lever R is furcated at its inner extremity, as shown at $s$, and to each of the furcations is pivoted a link, S. Each of the links S is pivoted to a lug, $t$, which rises from the upper part of an annular valve, T. The annular valve T is preferably made in the form best shown in Fig. 1—that is to say, it has exteriorly the form of a truncated cone, and the opening formed therein has also the form of a truncated cone, the apex of which lies in an opposite direction to the apex of the cone of which the exterior surface of said valve is a part. Both the exterior and interior surfaces of this valve seat in order to close the opening J in the hopper K.

The inner edge of the opening J faces the external seat of the valve T, and on the pipe O is formed in relation with the valve T another seat, U, which extends entirely around said pipe, and is also conical in form—that is to say, it has the form of a portion of a cone which has its apex pointed upward. The base of said cone is also cut away, so as to leave a free passage for the contents of the hopper through the opening J whenever the valve T is lowered into the space between the cap I and the cap N. This lowering of the valve T and the closing of said valve upon its seats is performed by means of the lever R and its link-connections S with the lugs t on the said valve. The relation of position of the valve-seat on the plate I with the valve-seat on the pipe O is horizontal.

It will now be seen that by the construction of the apparatus an annular cylindrical space, u, is left between the fire-brick cylinders L and L', and that between the fire-brick cylinder L and the metallic shell H is also left an annular chamber, u', of considerable extent. From this annular chamber lead two pipes, V and v. The pipe V is provided with a cap, W, which may be secured to it by means of a screw-clamp, w, or by any other suitable means. Whenever it is desired that the contents of the chamber u' shall pass freely away the cap, W is removed from the pipe V and a butterfly-valve or other suitable valve, y, in the pipe v is closed. On the contrary, when it is desired to lead off the gaseous or vaporous contents of the chamber u' for further treatment, the cap W is tightly closed upon the pipe V, and the valve y in the pipe v is opened, the pipe v being employed for connecting the apparatus constructed as herein described with sulphuric-acid chambers or other apparatus for treating the gaseous or vaporous products of the chamber u'.

To the bottom of the rim G, extending from the upper part of the fire box, are bolted or riveted guides and supports Y, Fig. 3, for an annular valve, Z, which has symmetrically-placed openings z formed therein, which correspond to similar openings, z', formed in the rim G, directly underlying the annulus u, between the cylinders L and L'. On a portion of the margin of said annular valve is formed a segmental rack, a', which is engaged by a segmental pinion, b', pivoted to the rim G, as shown at c', and operated by a hand-lever, d', for opening and closing the openings z' in the plate G'. The use of this valve is for discharging the desulphurized ore from the annulus u; but I do not limit myself to this particular construction of the valve Z. I may use separate valves successively to be operated in discharging the ore, or any other suitable means for opening and closing the bottom of the annulus u, for the purpose of discharging ore or other material to be treated.

Having thus described the mechanism of the apparatus, I will now proceed to describe its operation.

The ore or other substance to be treated—as, for instance, iron pyrites in the manufacture of sulphuric acid—is placed in the hopper K, and a fire is started upon the grate B. While the fire is kindling the cap or valve o is removed from the pipe O, in order that there may be free escape of the gases and vapors of combustion during the kindling of the fire, and also that there may be sufficient draft for the purpose of kindling prior to the application of the air-blast. When the fire has been sufficiently started, the air-blast is applied and supplies air through the pipe D to the valve-chest E. While bringing the fire to the proper intensity for heating purposes the valves e may be placed in the position shown in Fig. 1—that is to say, the upper valve, e, closed while the lower valve, e', is opened—thus permitting the entire blast to enter under the grate. The valve T, at the bottom of the hopper K, being then opened, the pulverized ore or other material passes through the annular space J, and falling upon the conical cap N slides or rolls off the same into the annulus u until the same is filled up to the level of the cap N. The valves e in the valve-chest E are then adjusted so that a portion of the air supplied by the blast will pass over the grate in sufficient quantity, while another portion passes through the pipe F, under and through the grate for the purposes of combustion. The amount of air which is led through the pipe F' is regulated not only by the action of the valve e, but also by the strength of the blast, and is to be supplied in such quantity that a portion of it passes through the pores and interstices between the bricks of the cylinder L' entirely unchanged in its chemical character, but highly heated. As soon as the ore or material to be treated in the annulus u has arrived at the proper temperature chemical combination ensues between the oxygen of the air and the oxidizable materials in the ore or other material to be treated—usually sulphur, in quantities sometimes as high as forty per cent. of the entire weight of the mass. The principal result of this combination is sulphurous acid, which, by the pressure of the air in the interior of the cylinder L', is forced out through the interstices and pores of the cylinder L into the chamber u', from whence it can be allowed to escape through the pipe V, if it be desired not to utilize it; or, if it is desired to be treated for other purposes—as the manufacture of sulphuric acid—it may be led through the pipe v to an apparatus for that purpose. Thereafter the process becomes continuous—that is to say, as fast as the ore or other substance in the annulus u is sufficiently desulphurized its removal from the bottom of the annulus is effected by opening the annular valve, hereinbefore described, which closes the bottom of said annulus, to which the ore or other substance is uniformly supplied from the hopper K by opening the valve T. In this way a thorough action upon every part of the ore or other substance to be treated of the heated oxygen contained in the air supplied through the pipe F' is secured, and by proper attention to the fire upon the grate the desulphurization process may go on for any length of time without cessation, thus securing a very economical application of the fuel as well as very thorough desulphurization of the material.

It will also be seen in regard to the apparatus that it may be made in small parts of sufficiently light weight to be carried on the backs of mules or other beasts of burden into regions almost inaccessible to ponderous apparatus.

I wish here to say that, although I have described the cylinders L and L' as being made of fire-brick having the form shown in Fig. 4, I do not limit myself to this material or mode of construction of said cylinders. Any material or mode of construction that will secure the diffused action of the heated oxygen derived from the air entering the interior of the apparatus through an annular stratum of ore or other material to be treated, and collect the same in the annular chamber exterior to said stratum, will be the equivalent of my apparatus. Neither do I limit myself to passing the oxygen from the interior of the annular stratum of ore or other material to be treated to the exterior.

It will be easy to construct an apparatus whereby the heated oxygen may be forced from the exterior through the porous or reticulated cylinders L and L' to the interior of the chamber for collecting the products of the reaction; and although I deem it more convenient and economical to construct the apparatus substantially as I have herein described it, such reversal of its operation would not materially alter the principle of its operation, and hence I should consider such construction and operation as the equivalents of my apparatus.

I am well aware that apparatuses for the desulphurization of ores by the passage through them of heated oxygen in heated air have been employed, and I do not therefore claim, broadly, either the process of so desulphurizing ores or an apparatus therefor. I confine my claims to the construction of my apparatus, which not only possesses the advantages of great portability and cheap durable construction, but also enables me to treat the ores or pyrites in a thin annular stratum of very large extent in proportion to space occupied in plan, and in such manner that every part of said stratum is conveniently, continuously, and uniformly acted upon by the free oxygen in the air passed in over the grate and heated before passing through said stratum, and in such manner that, without much increase of space, the gases produced by the desulphurization can be conveniently collected for further treatment, if desired.

Having thus described my improvement, what I claim to be new, and desire to secure by Letters Patent, is as follows:

1. In an apparatus for desulphurizing ores, the combination of a fire-box provided with an opening for admission of air below the grate and an opening for admission of air above the grate, a cylinder, L', composed of porous or interstitial materials arranged in relation concentrically with said fire-box, extending above the same and surmounted by a cap, N, for inclosing the space in the interior of said cylinder above said fire-box, cylinder L, composed of porous or interstitial material, arranged exteriorly and concentrically with the cylinder L' in such manner as to leave an annulus, $u$, between said cylinders, a cylinder, H, arranged exteriorly and concentrically with the cylinder L in such manner as to form an annular chamber, $u'$, surrounding the cylinder L', and the cap I, covering the annulus $u$ and the chamber $u'$, provided with openings J and $j$, respectively, for the admission of material to be treated to the annulus $u$ and for the escape of the products of the reaction, substantially as and for the purpose herein specified.

2. The combination, with the fire-box A, cylinders H, L, and L', and caps I and N, the cap I being provided with an opening, J, for admitting material to be treated to the annulus $u$, and an opening, $j$, for the escape of the products of the reaction, of the valve-chest E, pipes F F', respectively connecting said valve-chest with the space below and above the grate in the fire-box, and the valves $e\ e'$, for regulating the flow of the air through the pipes F and F', substantially as and for the purpose herein set forth.

3. The combination, with the cap I of an apparatus for desulphurizing ores, constructed with the cylinders L L' and fire-box A, substantially as herein set forth, said cap having an opening, J, for the admission of material to be treated, and a valve, T, for closing said opening, of a hopper, K, and a lever, R, pivoted to said hopper and connected by links with the valve T, for operating the same, substantially as and for the purpose herein described.

4. The combination, with the cap I of an apparatus for desulphurizing ores, constructed with the cylinders L and L' and fire-box A, substantially as herein described, and having an exterior annular chamber, $u'$, for the collection of the products of the chemical reaction in the apparatus, said cap I having an opening, $j$, communicating with said chamber for the escape of said products, of the pipe V, provided with a cap, W, and the pipe $v$, connected with the pipe V and provided with a valve, $y$, whereby said products may be allowed to escape into the open air or directed to another apparatus for further treatment, substantially as and for the purposes herein set forth.

5. In an apparatus for desulphurizing ores, constructed and operating substantially as described, the combination, with the cylinders L and L', composed of porous or reticulated material, arranged in relation with each other to leave an annulus, $u$, between said cylinders for the reception of material to be treated, of a valve or valves arranged in relation with said annulus at the bottom thereof, for the removal of said material from said annulus after the same has been passed through said annulus, substantially as and for the purpose herein specified.

6. In an apparatus for the desulphurization of ores, constructed substantially as herein described, with cylinders L and L', composed of porous or interstitial material, and arranged concentrically in such manner as to leave between them an annulus, $u$, for the reception of the material to be treated, the combination, with said cylinders, of the annular valve Z, arranged in relation with the bottom of the annulus $u$, having therein openings $z$, corresponding with openings $z'$ in the rim G of the fire-box which supports said cylinders, and also having on its perimeter a segmental rack, A', the segmental pinion $b'$, and lever $d$, for operating said pinion, and valve for discharging the material after the same has been treated, substantially as and for the purposes set forth.

7. In a furnace for desulphurizing ores, constructed and operating substantially as herein described, and having the interstitial or porous cylinders L and L', arranged concentrically with each other to leave an annular space, $u$, for the reception of material to be treated, the conical cap N, surmounting the interior cylinder, L', and the cap I, surmounting the cylinder L, having a central opening, J, for the introduction of material to be treated, arranged centrally over the apex of the cap N, whereby the ore introduced through the opening J is uniformly distributed to the annulus $u$, substantially as and for the purpose set forth.

8. In an apparatus for the desulphurization of ores, constructed with cylinders L L' and fire-box A, and operating substantially as herein described, the porous or interstitial cylinders L and L', arranged concentrically with each other in such manner as to leave an annular space, $u$, between them for the reception of the material to be treated, the conical cap N, having an opening, $n$, in its apex, the pipe O, for the escape of the gases of combustion, provided with a valve, $o$, for closing the same, and having thereon an annular valve-seat, U, the cap I, surmounting the cylinder L, having the central opening, J, arranged concentrically with the pipe O, and having an annular valve-seat in horizontal relation with the valve-seat U, and the annular valve T, having exteriorly the form of a truncated cone and provided with an annular opening having the form of an inverted truncated cone for closing the annular opening J, substantially as and for the purpose set forth.

9. In an apparatus for the desulphurization of ores, having a fire-box and the porous or interstitial cylinders L and L', arranged concentrically in such manner as to leave an annular space, $u$, between them for the reception of material to be treated, the segmental fire-bricks, herein described, for constructing said cylinders, said fire-bricks having a groove or recess, $m$, on their upper surface, and a tongue or projection, $l$, extending along their lower surface, whereby said bricks are made to engage each other and form a structure without the use of mortar or cement, substantially as and for the purpose herein set forth.

10. In an apparatus for desulphurizing ores, comprising a fire-box, A, and cylinders L and L', arranged concentrically with each other in such manner as to leave an annular space, $u$, between said cylinders for the reception of material to be treated, said cylinders being made of segmental bricks having along their upper surface the grooves $m$ and along their lower surface the tongue or projection $l$, of form corresponding to the grooves $m$, the combination, with said cylinders, of the rim G, projecting from the upper margin of the fire-box A, and having formed therein the annular recesses $g$, for the reception of the tongues or projections of the lower course of bricks in such cylinders, the cap N, having an annular projection, M', for engaging the recess in the upper course of fire-bricks in the cylinder L', and the cap I, having thereon the annular projection M, for engaging the recess in the upper course of bricks in the cylinder L, whereby said cylinders are bound and held concentrically with each other, substantially as and for the purposes herein specified.

FREDERICK SIBLEY.

Witnesses:
LEICESTER ALLEN,
JNO. E. GAVIN.